US010333628B2

(12) United States Patent
Li et al.

(10) Patent No.: US 10,333,628 B2
(45) Date of Patent: Jun. 25, 2019

(54) OPTICAL RECEIVERS

(71) Applicant: HEWLETT PACKARD ENTERPRISE DEVELOPMENT LP, Houston, TX (US)

(72) Inventors: Cheng Li, Palo Alto, CA (US); Marco Fiorentino, Mountain View, CA (US); Raymond G Beausoleil, Sr., Seattle, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/472,766

(22) Filed: Mar. 29, 2017

(65) Prior Publication Data

US 2017/0359119 A1    Dec. 14, 2017

Related U.S. Application Data

(60) Provisional application No. 62/348,472, filed on Jun. 10, 2016.

(51) Int. Cl.
| H04B 10/40 | (2013.01) |
| H04B 10/50 | (2013.01) |
| H04B 10/60 | (2013.01) |
| H04B 10/69 | (2013.01) |

(52) U.S. Cl.
CPC ......... *H04B 10/6931* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| 4,415,803 A | 11/1983 | Muoi |
| 4,565,974 A | 1/1986 | Smoot |
| 4,731,590 A | 3/1988 | Saari |
| 5,532,471 A | 7/1996 | Khorramabadi et al. |
| 5,602,510 A | 2/1997 | Bayruns et al. |
| 5,801,867 A * | 9/1998 | Geller .................... H04L 25/061 330/11 |
| 6,720,826 B2 | 4/2004 | Yoon |
| 6,720,830 B2 | 4/2004 | Andreou et al. |
| 6,737,924 B1 | 5/2004 | Paillet et al. |
| 7,236,056 B2 | 6/2007 | Chang et al. |
| 7,245,179 B2 | 7/2007 | Chang |

(Continued)

FOREIGN PATENT DOCUMENTS

WO    WO-2013166522 A1    11/2013

OTHER PUBLICATIONS

Triantafyllidis, M., "Adaptive Automatic Transmit Power Control," (Research Paper), Department of Electrical and information Technology, Lund University, in Cooperation with Ericsson AB, Jun. 2014, available at http://www.eit.lth.se/sprapport.php?uid=786.

(Continued)

*Primary Examiner* — Darren E Wolf
(74) *Attorney, Agent, or Firm* — Hewlett Packard Enterprise Patent Department

(57) ABSTRACT

According to one example, errors in a logical signal from a data slicer are detected and a power supply voltage is adjusted based on the detected errors.

20 Claims, 6 Drawing Sheets

(56) References Cited

U.S. PATENT DOCUMENTS

| | | | |
|---|---|---|---|
| 7,305,190 | B2 | 12/2007 | Mayampurath et al. |
| 8,023,835 | B2 | 9/2011 | Kim et al. |
| 8,274,335 | B1 | 9/2012 | Chatwin |
| 8,509,629 | B2 | 8/2013 | Zou et al. |
| 8,514,015 | B2 | 8/2013 | Chen |
| 8,731,412 | B2 | 5/2014 | Ito et al. |
| 8,841,969 | B2 | 9/2014 | Lee et al. |
| 9,065,407 | B2 | 6/2015 | Zou et al. |
| 9,215,114 | B2 | 12/2015 | Emami-Neyestanak |
| 10,044,328 | B2 | 8/2018 | Khaw |
| 2002/0153949 | A1 | 10/2002 | Yoon |
| 2003/0161640 | A1 | 8/2003 | Kimura |
| 2003/0214353 | A1 | 11/2003 | Yoon |
| 2003/0218508 | A1 | 11/2003 | Chiou et al. |
| 2004/0129862 | A1 | 7/2004 | McTaggart |
| 2006/0071710 | A1 | 4/2006 | Chang |
| 2006/0261895 | A1 | 11/2006 | Kocaman et al. |
| 2006/0290432 | A1 | 12/2006 | Chang et al. |
| 2007/0071455 | A1 | 3/2007 | Margalit et al. |
| 2007/0222511 | A1 | 9/2007 | Chang |
| 2008/0309407 | A1 | 12/2008 | Nakamura et al. |
| 2009/0110409 | A1 | 4/2009 | Zou et al. |
| 2009/0163784 | A1 | 6/2009 | Sarpeshkar et al. |
| 2010/0086315 | A1 | 4/2010 | Tanaka |
| 2012/0217381 | A1 | 8/2012 | Tatsumi |
| 2012/0249240 | A1 | 10/2012 | Chatwin |
| 2013/0135054 | A1 | 5/2013 | Ito et al. |
| 2013/0188965 | A1* | 7/2013 | Afriat .................. H04B 10/60 398/136 |
| 2013/0216241 | A1 | 8/2013 | Proesel et al. |
| 2014/0097901 | A1 | 4/2014 | Sano et al. |
| 2014/0185661 | A1 | 7/2014 | Chang et al. |
| 2014/0255037 | A1 | 9/2014 | Shang |
| 2014/0306760 | A1 | 10/2014 | Piepenstock et al. |
| 2015/0071654 | A1 | 3/2015 | Morita |
| 2015/0155951 | A1 | 6/2015 | Noda |
| 2016/0006395 | A1 | 1/2016 | Kim et al. |
| 2016/0142179 | A1* | 5/2016 | Fludger ............ H04B 10/25137 398/65 |
| 2016/0149548 | A1 | 5/2016 | Gorecki et al. |
| 2018/0026597 | A1 | 1/2018 | Barabas et al. |
| 2018/0234096 | A1 | 8/2018 | Li et al. |

OTHER PUBLICATIONS

Youn, J.S. et al., "An Integrated 12.5-Gb/s Optoelectronic Receiver with a Silicon Avalanche Photodetector in Standard SiGe BiCMOS Technology." Dec. 17, 2012, 10 pps., <http://www.ncbi.nlm.nih.gov/pubmed/23263050>.

Yu et al., "56 Gb/s PAM-4 Optical Receiver Frontend in an Advanced FinFET Process", IEEE 58th International Midwest Symposium on Circuits and Systems (MWSCAS), Aug. 2015.

Atef, M., et al.; "An integrated optical receiver for 2.5Gbits/s using 4-PAM signaling"; Dec. 19-22, 2010; 4 pages.

Chin, P. et al.; "Analysis and Design of High Performance and Low Power Current Mode Logic CMOS"; downloaded Jul. 31, 2015 from bwrcs.eecs.berkeley.edu/Classes/icdesign/ee241_s06/.../ChinSuZhong.doc, 3 pages.

EP Search Report cited in EP Appl. No. 15900509.9 dated Nov. 7, 2018; 19 pages.

Heydari, P., "Design of Ultrahigh-Speed Low Voltage CMOS CML Buffers and Latches," IEEE Transactions on Very Large Scale Integration (VLSI) Systems, vol. 12, No. 10, Oct. 2004, pp. 1081-1093.

Ingel, M., et al; "A 1-Gb/s, 0.7-um CMOS Optical Receiver with Full Rail-to-Rail Output Swing"; Jul. 7, 1999; 7 pages.

Juang, C., et al., "Transimpedance amplifiers using three cascade variable inverter gain stages"; In: Analog Integrated Circuits and Signal Processing, Sep. 11, 2006, vol. 49, pp. 299-302.

Kern, A.M. et al.; "CMOS Circuits for VCSEL-Based Optical IO"; Aug. 16, 2007; 129 pages.

Moghimi R., "Amplifiers as Comparators?", ADI—Analog Dialog, vol. 37, Apr. 2003, pp. 1-10.

PCT International Search Report issued in Appl. No. PCT/US2015/043078; dated May 30, 2016; 3 pages.

* cited by examiner

OPTICAL RECEIVERS

RELATED PATENT DATA

Cross-Reference to Related Application

This application claims priority to U.S. Provisional Application Ser. No. 62/348,472, which was filed on Jun. 10, 2016 which is herein included by reference in its entirety for all purposes.

This invention was made with government support under Contract No. H98230-14-3-0011, awarded by Maryland Procurement Office. The government has certain rights in the invention.

BACKGROUND

An optical receiver is a device that receives an optical signal and converts it to an electrical signal. In the context of photonics, optical receivers may be used to convert a signal from an optical fiber into a logical electrical signal which may be processed by electronic circuitry. An optical receiver may include a photodetector and a transimpedance amplifier (TIA) to convert an electrical current from the photodetector into a corresponding voltage.

BRIEF DESCRIPTION OF THE DRAWINGS

Examples of the disclosure will now be described, by way of non-limiting example only, with reference to the accompanying drawings, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. The term "number" means any natural number equal to or greater than one. In addition, the terms "a" and "an" are intended to denote at least one of a particular element.

As described above, an optical receiver may include a photodetector to convert an optical signal to a current signal and a transimpedance amplifier (TIA) to convert the current signal to a voltage signal. The voltage signal will typically be an analogue signal and may be converted to a logical signal by a data slicer.

The amplitude of the current signal from a photodetector can vary widely, depending on the operating environment, due to variations in input capacitance, modulator/photodetector performance, and link budget. As a result the transimpedance amplifiers (TIAs) in optical receivers tend to be set for a high gain so as to ensure that even weak signals can be detected. However, this is an inefficient approach, which is wasteful when the received signal is strong, and may cause overheating due to the large amount of power supplied to the TIA to maintain high gain.

Accordingly, the present application proposes an optical receiver which includes a logic device or circuit to detect errors in the logical signal of the data slicer. A voltage supplied by a power supply to the TIA may then be adjusted based on the detected errors.

Figure 1:
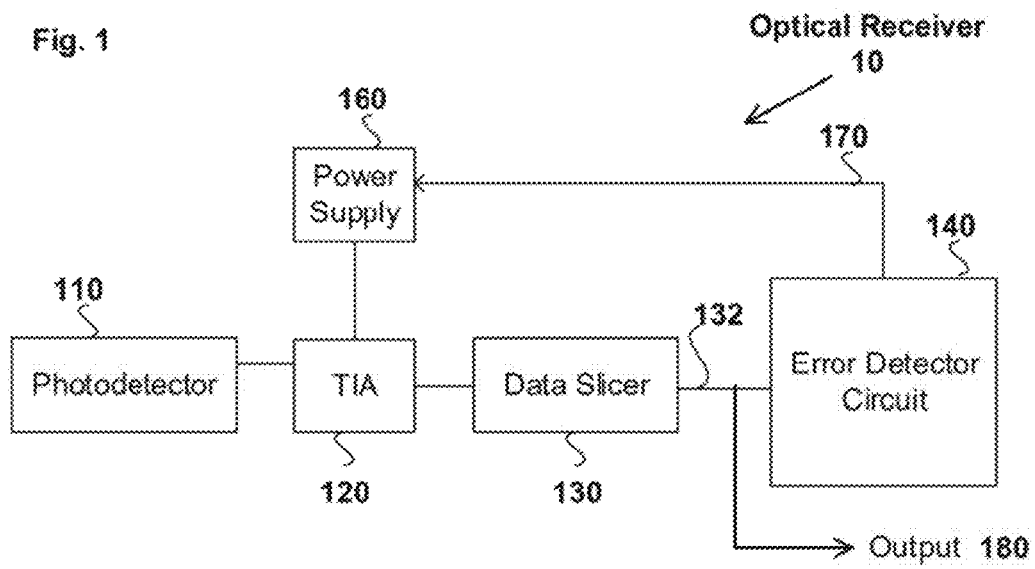
FIG. 1 shows an example of an optical receiver according to the present disclosure.

FIG. 1 shows an example optical receiver 10 including a photodetector 110, a transimpedance amplifier (TIA) 120, a data slicer 130, an error detector circuit 140 and a power supply 160.

The photodector 110 is to receive an optical signal, such as an optical signal from an incident light source or an optical waveguide, and convert the optical signal into a corresponding electrical current. The photodetector may, for example, be a photodiode.

The TIA 120 is a current to voltage converter and converts the current output from the photodetector 110 into a useable voltage. The TIA thus receives the current signal from the photodetector 110 and outputs a corresponding voltage signal. The TIA is connected to a power supply 160 which supplies an adjustable voltage to the TIA, which powers the current to voltage conversion and amplification performed by the TIA. The magnitude of the power supply voltage is one factor in determining the gain and sensitivity of the TIA. When the power supply voltage is higher, the TIA has a higher power consumption and gain and sensitivity are high. The TIA thus outputs a stronger voltage signal for a given input signal and may be able to detect and encode relatively weak optical signals. When the power supply voltage to the TIA is lower, then the power consumption is less, but gain and sensitivity are low. In this case, due to low gain and sensitivity of the TIA, the optical receiver may have difficulty in accurately detecting weak optical signals. However, when the power supply voltage is low power consumption is reduced and the optical receiver can still detect strong optical signals.

The TIA may include one or more inverter stages with resistive feedback. The inverter stages may be biased around the trip-point for maximum gain. In one example, the TIA has an offset control loop that subtracts the average photocurrent from the input node. While the gain and sensitivity of TIAs is always dependent to some extent on the power supply voltage, this is even more so for this inverter-based TIAs architecture.

The voltage signal output by the TIA is coupled to the data slicer 130. A data slicer is a device that converts an analogue voltage signal into a digital logical signal, e.g. into a logical signal having either a high logic state (1) or a low logic state (0). The data slicer 130 thus outputs a logical signal 132 based on the voltage signal which it receives from the TIA.

The data slicer 130 may be a comparator that compares a pair of voltages and outputs a high logic state if the difference between the voltages is above a preset voltage threshold, and otherwise outputs a low logic state. The data slicer may, for example, compare a single voltage signal output by the TIA with a reference voltage, or may compare a pair of voltages output by the TIA if the TIA has a differential output. The preset voltage threshold is known as the "input voltage offset" of the data slicer. In some cases, the input voltage offset may be adjustable.

The data slicer may be a clocked comparator, which is a comparator which samples the input voltages and outputs a logic signal once every clock cycle. The clock may be internal to, or external from, the optical receiver 10.

From the above, it will be appreciated that the data slicer 130 outputs a logical signal 132 comprising high and low logic states, based on the voltage signal which it receives from the TIA. This logical signal is output to the error detector circuit 140 and may also be coupled directly, or indirectly, to the output 180 of the optical receiver. The output 180 of the optical receiver 10 may therefore be based on the logical signal 132 from data slicer 130. In one example, the logical signal is coupled indirectly via an amplifier, equalizer and/or other circuits to the output of the optical receiver.

The error detector circuit 140 determines an error rate of the data slicer. The error detector circuit 140 may, for example, do this by detecting and keeping a count of errors in the logical signal output from the data slicer 130. The circuit 140 includes logic to adjust the power supply voltage to the TIA, based on the determined error rate. The error detector circuit may adjust the power supply voltage by sending a control signal 170 to the power supply 160 or to a controller of the power supply. The error detector circuit 140 may, for example, be an electronic circuit, a combination of electronic devices, an application specific integrated circuit (ASIC) or field programmable gate array (FPGA) etc.

Figure 2:
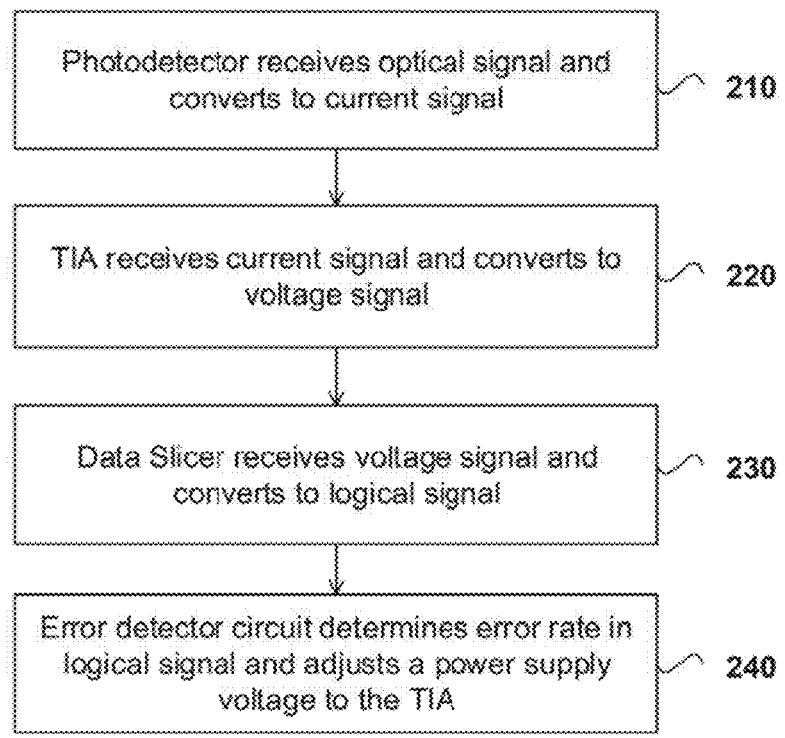
FIG. 2 shows an example method of operation of an optical receiver according to the present disclosure.

FIG. 2 shows an example method of operation of the optical receiver 10 of FIG. 1.

At block 210 the photodetector 110 receives an optical signal and converts the optical signal into an electrical current signal.

At block 220 the TIA 120 receives the current signal from the photodetector and converts the current signal to a voltage signal which is output from the TIA.

At block 230, the data slicer 130 receives the voltage signal from the TIA and converts the voltage signal into a logical signal. The logical signal is output from the data slicer 130 and is received by the error detector circuit 140.

At block 240, the error detector circuit 140 determines an error rate in the logical signal received from the data slicer 130 and adjusts a power supply voltage to the TIA. Thus, the error detector circuit 140 may adjust the level of voltage input by the power supply 160 to the TIA 120.

The error detector circuit 140 may adjust the power supply voltage to the TIA 120 so as to minimize power consumed by the TIA, while maintaining an error rate of the data slicer and/or the optical receiver below a preset threshold. For example, the preset threshold may be an acceptable error rate, such as a maximum acceptable bit error rate (BER) of the data slicer. Depending on the design, this error threshold may be set by the manufacturer, or by a user, of the optical receiver.

For example, if the error rate is considered to be too high, such as above the preset threshold, then the error detector circuit may increase the power supply voltage. This will increase amplification of the photodetector signal by the TIA and lead to a stronger output voltage signal. Once the output voltage signal from the TIA is strong enough, the error rate should reduce. On the otherhand, if the error rate is at or below a second threshold (which may be zero errors or a small number of errors), then it should be possible to reduce the power supply voltage without risking significant errors. In this case the power supply voltage may be reduced in order save power and reduce heating.

Figure 3:
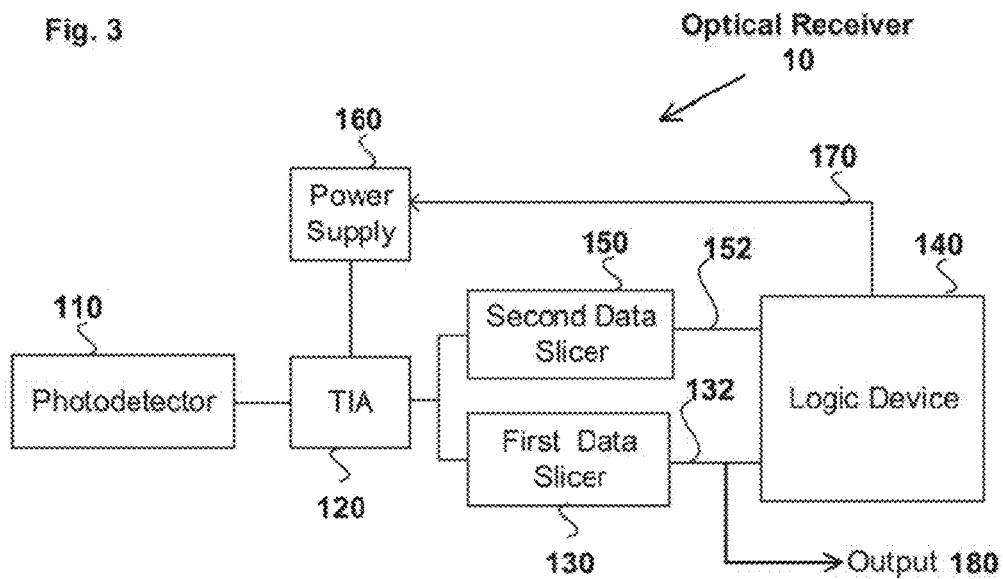
FIG. 3 shows an example of an optical receiver according to the present disclosure.

FIG. 3 shows another example of an optical receiver 10, which is similar to the example shown in FIG. 1. However, in the example shown in FIG. 3, there are two data slicers: a first data slicer 130 and a second data slicer 150. Both data slicers receive the voltage signal from the TIA 120 and output respective logical signals to logic device 140 which acts as an error detector circuit.

The logic device 140 may, for example, be an electronic circuit, a combination of electronic devices or an application specific integrated circuit (ASIC) or field programmable gate array (FPGA). As explained in more detail below, the logic device 140 may detect errors by comparing the logical signals output from the first and second data slicers. This is in contrast to FIG. 1 where the error detector circuit determines an error rate of a single data slicer 130 based on analyzing characteristics of the output of said single data slicer 130.

The second data slicer 150 may be less sensitive than the first data slicer 130. This means that the second data slicer is more prone to errors when there is a relatively weak voltage signal from the TIA. There are various ways in which the second data slicer may be made less sensitive. For example, a voltage threshold at which the second data slicer converts the voltage signal to a high logical output may be higher than a voltage threshold at which the first data slicer converts the voltage signal into a high logical output. In one example, the voltage offset threshold of the second data slicer is higher than the voltage offset threshold of the first data slicer. In another example, a circuit element to reduce the magnitude of the input voltage signal may be placed between the input to the second data slicer and the output of the TIA.

As the second data slicer is more prone to errors when the TIA output signal is weak, the second data slicer acts as an eye monitor. That is, as the TIA voltage signal weakens, errors will occur in the logical signal output by the second data slicer, before errors occur in the logical signal output by the first data slicer. The second data slicer may thus be thought of as an eye monitor, as it is able to detect when the eye pattern of the voltage signal output from the TIA closes due to a weak current signal/insufficient amplification.

When an unacceptable number of errors occur in the logical signal of the second data slicer, the logic device may adjust the power supply voltage upwards so as to increase the strength of the TIA voltage signal and thus prevent, or reduce the number of, errors occurring in the logical signal of the first data slicer. In this way the second data slicer acts as an early warning signal and by increasing the power supply voltage to the TIA, the logic device pre-empts errors from occurring in the first data slicer. As the optical receiver output 180 is based on logical signal 132 of the first data slicer, this enables the error rate of the optical receiver to be kept below a desired level. Likewise, if the number of errors in the logical signal of the more error prone second data slicer is low, then the power supply voltage may be safely reduced without risking errors in the first data slicer.

The first data slicer 130 thus outputs a first logical signal 132 based on the voltage signal which it receives from the TIA. The second data slicer 150 outputs a second logical signal 152 based on the voltage signal which it receives from the TIA. In one example, the data slicers are clocked comparators and the clock of the first data slicer is synchronized with the second data slicer so that the first and second data slicer sample the input voltage signals from the TIA at the same period in time. The clock may be internal to, or external from, the optical receiver.

Figure 4:
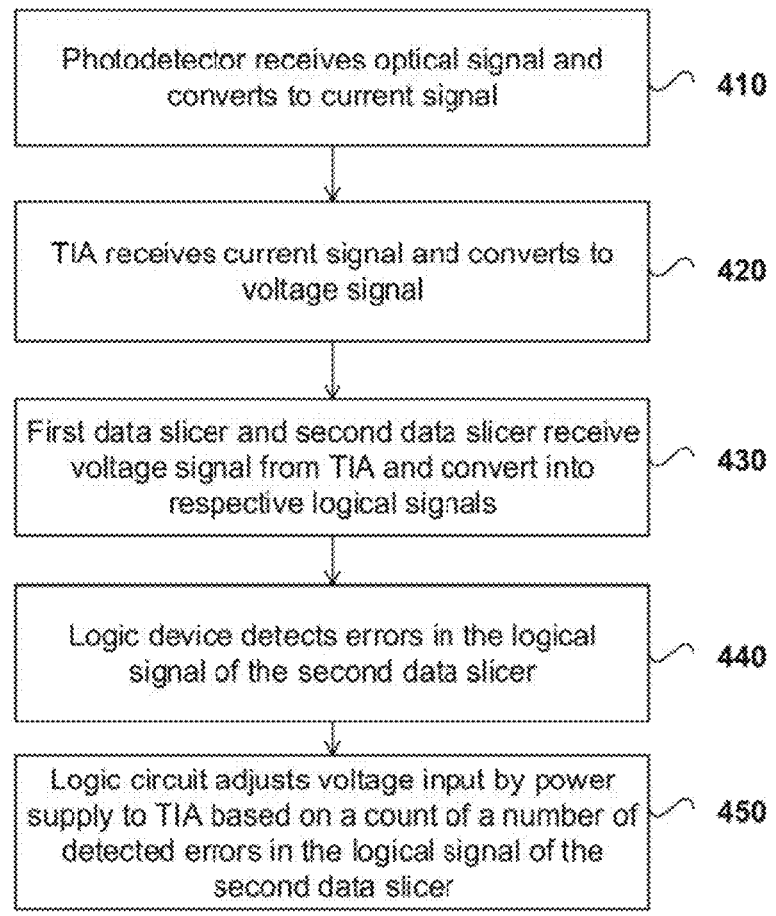
FIG. 4 shows an example method of operation of an optical receiver according to the present disclosure.

FIG. 4 shows an example method of operation of the optical receiver 10 of FIG. 3. At block 410 the photodetector 110 receives an optical signal and converts the optical signal into a corresponding electrical current signal. At block 420 the TIA 120 receives the current signal from the photodetector and converts the current signal into a corresponding voltage signal which is output by the TIA.

At block 430 the first data slicer 130 and the second data slicer 150 both receive the voltage signal from the TIA and convert the voltage signal into respective logical signals. The first data slicer thus outputs a logical signal 132, while the second data slicer outputs a logical signal 152.

The logic device 140 receives the logical signal 132 from the first data slicer and the logical signal 152 from the second data slicer. At block 440 the logic device detects errors in the logical signal of the second data slicer. For example, the logic device 140 may detect errors in the logical signal of the second data slicer by comparing the logical signal of the second data slicer with the logical signal of the first data slicer.

At block 450 the logic device 140 adjusts the power supply voltage input by the power supply 160 to the TIA 120, based on a count of the number of detected errors in the logical signal of the second data slicer. The logic device may adjust the power supply voltage by sending a control signal 170. The control signal 170 may be directed to the power supply 160 itself, or to a controller of the power supply 160. In this way, the logic device 140 may control the level of voltage supplied by the power supply to the TIA. For example, if the error rate of the second data slicer is too high, then the power supply voltage may be increased so as to increase the amplification by the TIA and improve the strength of the voltage signal reaching the first and second data slicers. On the otherhand, if the error rate of the second data slicer is considered acceptable, for example equal to or below a preset threshold, then the power supply voltage may be reduced in order to reduce the power consumption by the TIA. In this way power consumption may be reduced while keeping the error rate below a preset threshold. The preset threshold may be related to a maximum acceptable error rate for the output of the optical receiver. In one example, the maximum acceptable error rate may be zero or a very low ratio.

As mentioned above, the logic device 140 acts as an error detector circuit to detect errors in the logical signal from the second data slicer. The logic device may count a number of detected errors in the logical signal of the second data slicer. Based on the counted number of errors, the logic device may determine an error rate of the logical signal of the second data slicer. The error rate may be a number of errors in a predetermined period of time, or predetermined number of bits, or predetermined number of logic state transitions. In one example the count of the detected number of errors in a predetermined period time or number of bits etc, may itself be taken as the error rate. In other examples, the logic device may calculate an error rate as a ratio of detected errors to a period of time or number of bits etc.

In one example, errors in the logical signal of the second data slicer are detected by comparing the logical signal of the second data slicer with the logical signal of the first data slicer. The logic device 140 may for example determine there is an error in the logical signal of the second data slicer when the logical signal of the first data slicer is high and in a same time period the logical signal of the second data slicer is low.

Figure 5:
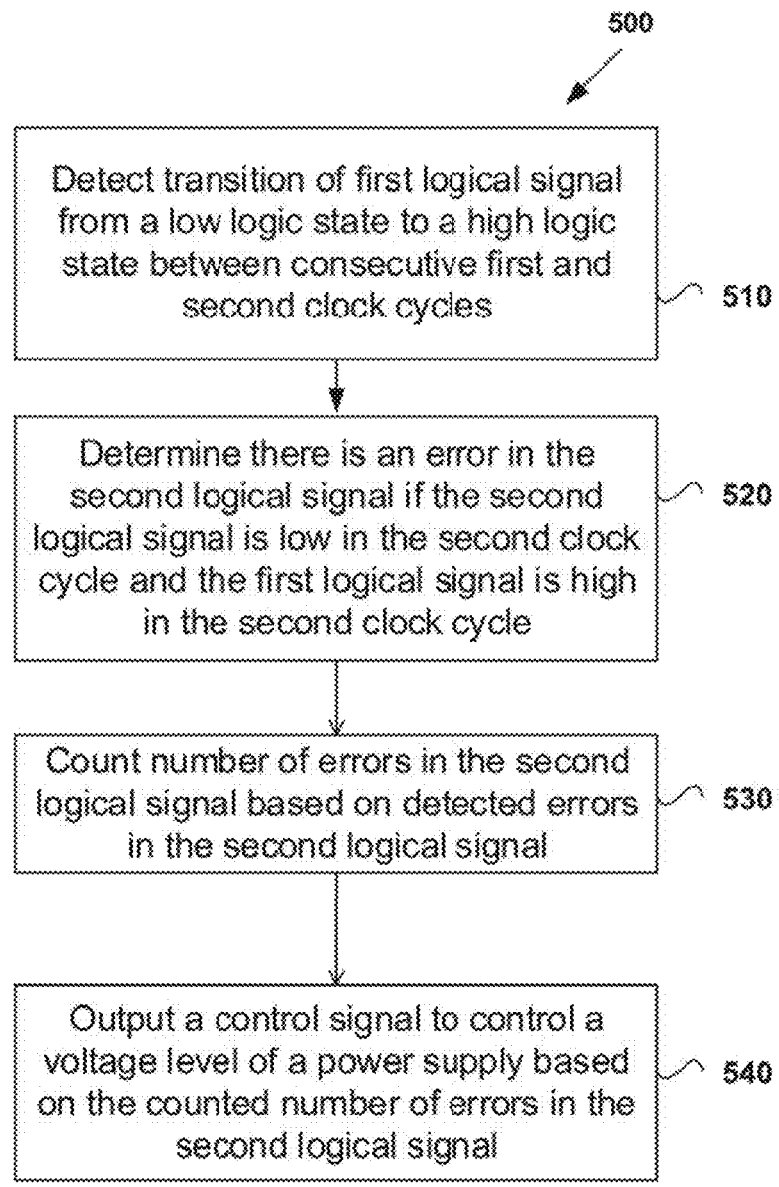
FIG. 5 shows an example method of detecting errors and outputting a control signal according to the present disclosure.

FIG. 5 shows an example method of operation for the logic device 140. For ease of reference in this diagram, the logical signal of the first data slicer is referred to as the first logical signal, while the logical signal of the second data slicer is referred to as the second logical signal.

At block 510 the logic device detects a transition of the first logical signal from a low logic state to a high logic state, between consecutive first and second clock cycles. For example, the logic device detects that in a first clock cycle the first logical signal has a low logic state, while in a second clock cycle immediately after the first clock cycle, the first logical signal has a high logic state.

This low to high transition is the most likely time for an error to occur in a data slicer due to a weak input voltage/insufficient amplification by the TIA. That is, when the optical signal changes from a low to a high state, then the photocurrent and the voltage signal from the TIA increases. However, if the voltage signal from the TIA is weak then this increase may not be enough to trigger the second data slicer to switch from the low logic state to the high logic state. That would result in an error in the output of the second data slicer. An error due to insufficient amplification is more likely to occur with this low to high transition, than in a continuous set of high bits, or a transition from high to low.

In response to detecting this low to high transition in the first logical signal, the logic device may check the logic state of the second logical signal in the second clock cycle.

At block 520 the logic device may determine there is an error in the second logical signal if the second logical signal is low in the second clock cycle and the first logical signal is high in the second clock cycle.

At block 530 the logic device may count a number of errors in the second logic signal based on the detected errors in the second logical signal. This may include determining an error rate of the second logical signal. As explained above, this error rate may be based on a count of detected errors over a predetermined time period, such as number of clock cycles, or received bits, or even logic state transitions etc.

At block 540 the logic device may output a control signal to control a voltage level of a power supply based on the counted number of errors of the second logical signal. In one example, the counted number of errors is used to determine an error rate of the second logical signal and the control signal is a based on the determined error rate of the second logical signal.

Figure 6:
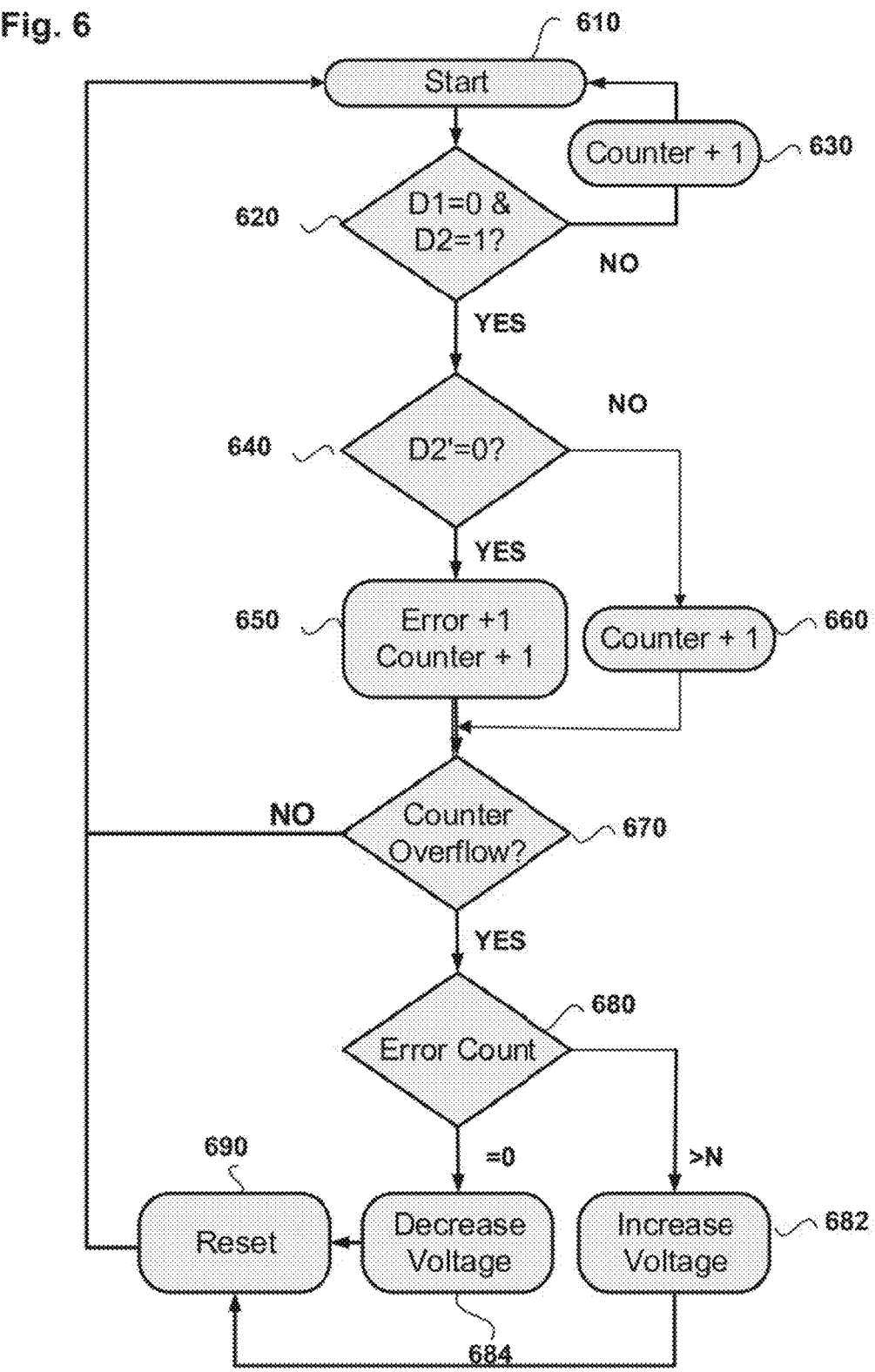
FIG. 6 shows an example method of operation of a logic device according to the present disclosure.

FIG. 6 shows another example method of operation of the logic device 140.

The method starts at block 610.

The logic device 140 receives a first logical signal from the first data slicer 130 and a second logical signal from the second data slicer 150. The logic state of the first logical signal in a first clock cycle is referred to as D1, while the logic state of the first logical signal in a second clock cycle is referred to as D2. The logic state of the second logical signal in a first clock cycle is referred to as D1', while the logic state of the second logical signal in a second clock cycle is referred to as D2'. Here the terms first and second clock cycle are simply meant to indicate any two consecutive clock cycles.

At block 620, the logic device determines if D1=0 and D2=1, i.e. if the first logical signal is low in the first clock cycle and high in the second clock cycle. This check may be carried out every clock cycle, in which case D1 refers to the previous clock cycle and D2 to the current clock cycle.

If the determination at block 620 is negative, then a bit counter is incremented by 1 and the method returns to block 610. The bit counter counts the number of bits received by the optical receiver and may be thought of as a time counter. Hereinafter and in FIG. 6, the bit counter is simply referred to as the "counter".

If the determination at block 620 is positive, then the method proceeds to block 640. At block 640 the logic device determines whether D2'=0, i.e. if the second logical signal is low in the second clock cycle. If the determination is positive, i.e. if D2'=0, this indicates that there is an error in the second logical signal.

As the first logical signal is assumed to be correct, if the first logical signal in the second clock cycle is high, while the second logical signal in the second clock cycle is low, then this means the second logical signal is incorrect, for example because the increment in the voltage signal from the TIA was not sufficient to switch the second data slicer to the high logic state.

Thus, if the determination at block 640 is positive then the counter is incremented by one and a separate error counter is also incremented by one. The method then proceeds to block 670.

If the determination at block 640 is negative, then the counter is incremented by one (as another bit has been received), but the error counter is not incremented. The method then proceeds to block 670.

At block 670 the logic device checks if the counter has overflown. If not then the method goes back to block 610. However, if the counter has overflown then the method proceeds to block 680. It is to be understood that rather than an active check per se, the counter overflowing may simply trigger block 680.

At block 680 the error counter is counted, i.e. the number of detected errors as indicated by the error counter is determined. If the number of detected errors in the second logical signal is greater than a first threshold N, then logic device causes the power supply voltage to be increased at block 682 and the method proceeds to block 690. If the number of detected errors in the second logical signal is less than a second threshold, which in the illustrated example is 0 errors but may be another number, then the logic device cause the power supply voltage to be decreased at block 684 and the method proceeds to block 690.

While not shown in FIG. 6, in some examples if the number of detected errors is less than the first threshold, but greater than the second threshold, then the power supply voltage may be kept the same and not adjusted. This may help to prevent dither or rapid changing up and down of the power supply voltage.

At block 690 the bit counter and the error counter are both reset and the method returns to block 610.

It is to be understood that FIGS. 5 and 6 are just examples and various other methods and variations are possible. For example, while FIG. 6 assumes two separate counters: a bit counter and an error counter, in another example there may just be an error counter. In that case, instead of overflow of a bit counter, block 680 may be triggered by the logic device receiving an external reset signal. For instance, the logic device may have a slow clock input which is equal to a number of cycles M, e.g. 500 cycles, of a clock signal of the first and second data slicers. In that case the error counter is checked and blocks 680 and 682 or 684 performed every M clock cycles.

In another example, rather than checking for a low to high transition of the first logical signal at block 620, the logic device may simply compare the first logical signal with the second logical signal by using an exclusive or (XOR) gate and determine there is an error in the second logical signal whenever the second logical signal is different from the first logical signal.

Figure 7:
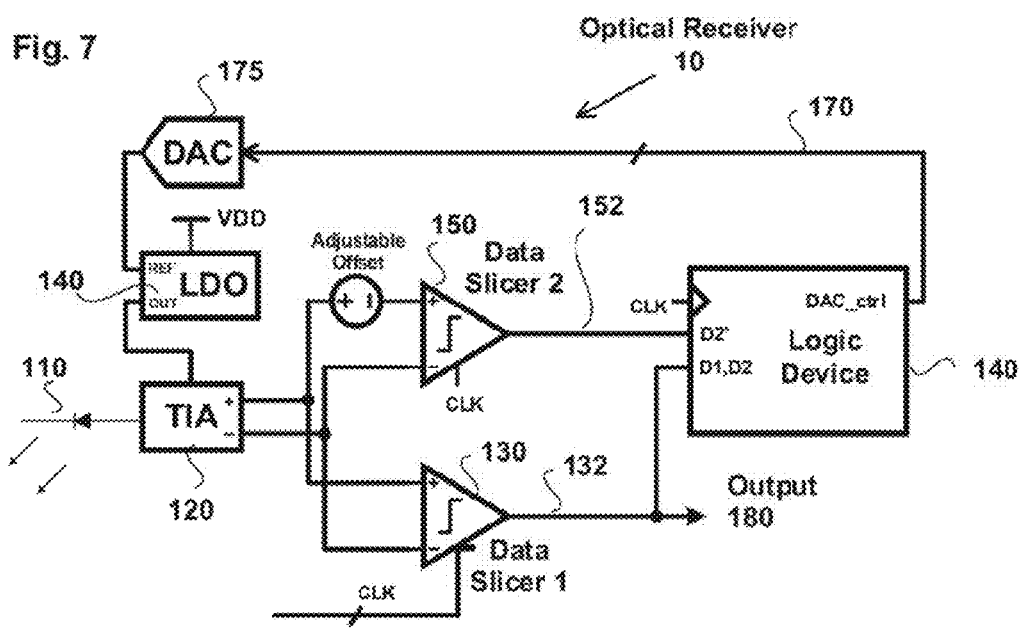
FIG. 7 shows an example optical receiver according to the present disclosure.

FIG. 7 shows an example optical receiver which is similar to FIG. 3 and in which like parts have the same reference numerals. The control signal 170 is output from the logic device 140 to a digital to analogue converter (DAC) 175. The control signal may for example be a code or number representing the error rate or counted number of errors. The DAC converts this to an analogue voltage which is output to the power supply 140. The power supply 140 may be a regulator, such as a low-dropout regulator (LDO). The LDO receives a reference voltage from the DAC and supplies power to the TIA 110 through its output port. The voltage supplied to the TIA by the LDO is based on the reference voltage received from the DAC.

In the example of FIG. 7 the TIA has a differential output, which means that the TIA has a pair of outputs. In one example the TIA has two inputs and amplifies any difference between the two inputs at its two outputs. For example, the TIA may take the photodiode current as a first input, and a capacitor or dummy photodiode which is not exposed to the optical signal, as its second input. In any case, the TIA has two outputs.

Figure 8:
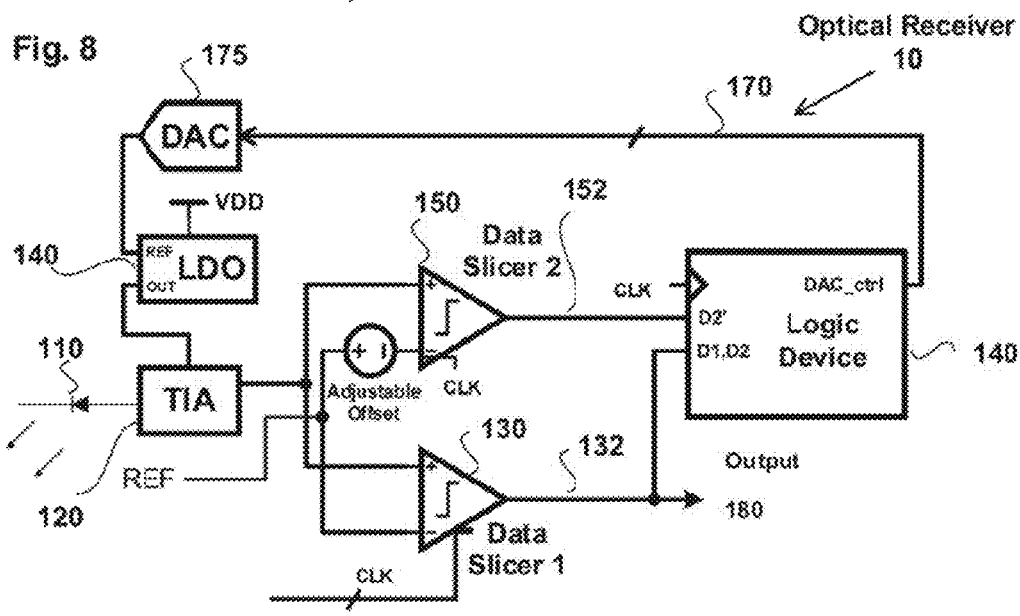
FIG. 8 shows an example optical receiver according to the present disclosure.

The first output of the TIA, denoted by "+" in FIG. 7, is output to both the first and second data slicers. The second output of the TIA, denoted by "−" in FIG. 7, is output to both the first and second data slicers. Thus the first data slicer receives the "+" and "−" voltage signals as its two inputs, as does the second data slicer. FIG. 8 shows another variation, which is similar to FIG. 7, but in which the TIA has a single output, rather than a differential output. In this case the first data slicer takes the single output of the TIA as its first input and a reference voltage REF as a second input. Likewise, the second data slicer takes the single output of the TIA as its first input and a reference voltage as a second input.

In both FIGS. 7 and 8 the logic device 140 receives inputs from both the first data slicer and the second data slicer. The reference numerals D1, D2 denote the logical signal from the first data slicer at first and second consecutive time periods, as monitored by the logic device. The reference numeral D2' denotes the logical signal from the second data slicer at the second time period, as monitored by the logic device, as described above. The logic device and first and second data slicers may also receive a clock signal.

Figure 9:
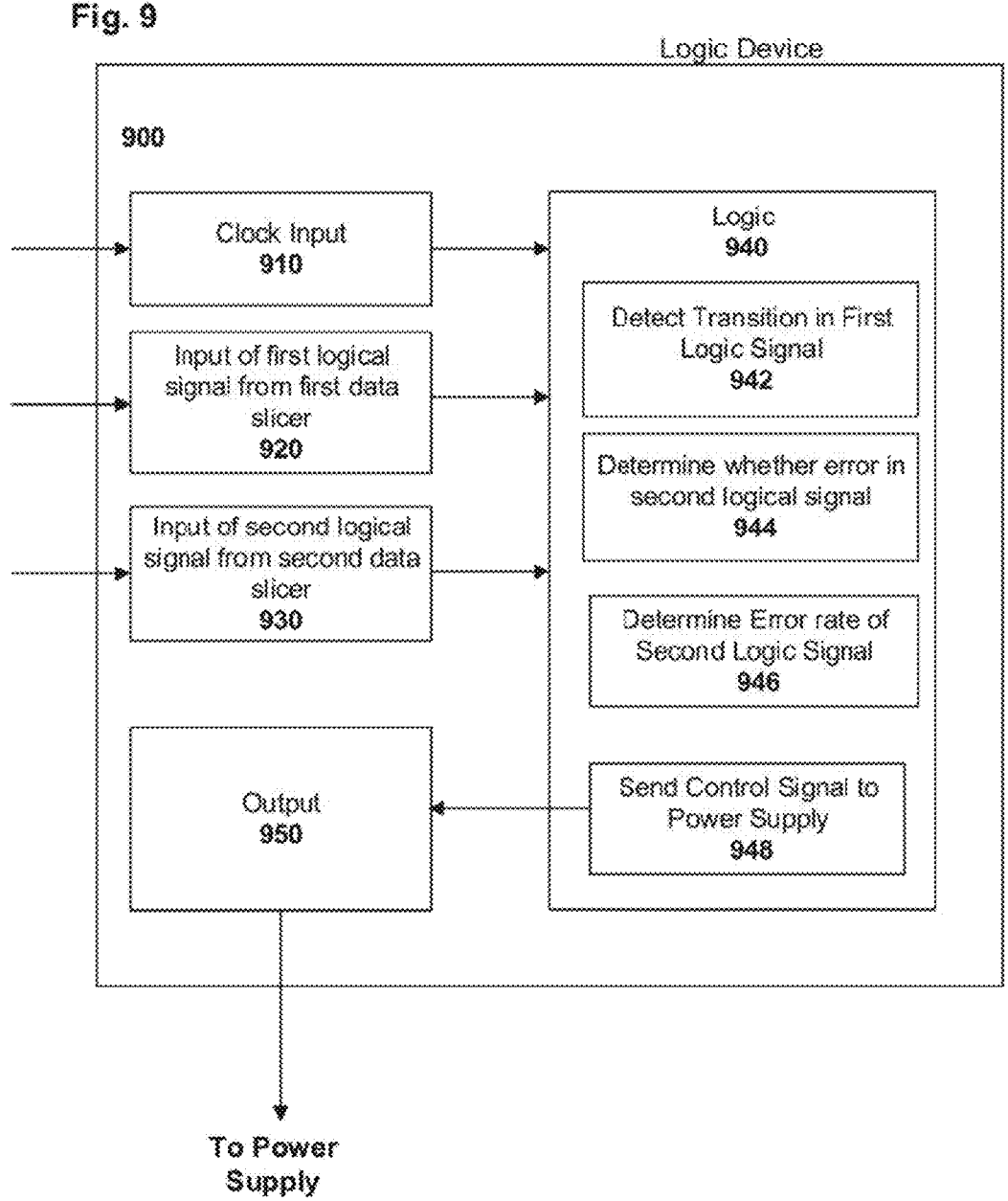
FIG. 9 shows an example structure of a logic device according to the present disclosure.

FIG. 9 shows an example structure of a logic device, such as the logic device of FIGS. 3, 7 and 8. The logic device includes an interface to receive a clock signal 910, an interface to receive a first logical signal from a first data slicer 920 and an interface to receive a second logical signal from a second data slicer 930. The logic device further includes logic 940 to detect errors in the signal from the second data slicer and generate a control signal for a TIA power supply based on the detected errors. The logic may include logic 942 to detect a transition in the first logic signal, logic 944 to determine whether there is an error in the second logic signal, logic 946 to determine an error rate of the second logic signal and logic 948 to send via an output interface 950 a control signal for a power supply based on the determined error rate. The logic device may for example operate in accordance with the methods of FIG. 5 or FIG. 6 described above.

The logic device 140 may, for example, be an electronic circuit, a combination of electronic devices or an application specific integrated circuit (ASIC) or field programmable gate array (FPGA). In one example, the logic device may comprise a processor and memory, or other non-transitory storage medium, storing machine readable instructions which are executable by the processor to perform the above logic and methods.

All of the features disclosed in this specification (including any accompanying claims, abstract and drawings), and/or all of the blocks of any method or process so disclosed, may be combined in any combination, except combinations where at least some of such features and/or blocks are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An optical receiver including:
   a photodetector;
   a transimpedance amplifier (TIA) to receive a current signal from the photodetector and output a voltage signal;
   a first data slicer to receive the voltage signal from the TIA and convert the voltage signal into a logical signal;
   a second data slicer to receive the voltage signal from the TIA and convert the voltage signal into a logical signal, wherein the second data slicer is less sensitive than the first data slicer; and
   a circuit to detect errors in the logical signal from the second data slicer and to adjust a power supply voltage input to the TIA based on a count of a number of detected errors in the logical signal from the second data slicer.

2. The optical receiver of claim 1 wherein the first data slicer and second data slicer are clocked comparators.

3. The optical receiver of claim 1 wherein an output of the optical receiver is based on the logical signal of the first data slicer.

4. The optical receiver of claim 1 wherein a voltage threshold at which the second data slicer converts the voltage signal to a high logical output is higher than a voltage threshold at which the first data slicer converts the voltage signal into a high logical output.

5. The optical receiver of claim 1 wherein the circuit is to detect an error in the logical signal from the second data slicer by comparing the logical signal from the second data slicer with the logical signal from the first data slicer.

6. The optical receiver of claim 1 wherein the circuit is to determine there is an error in the logical signal from the second data slicer when the logical signal from the first data slicer is high and in a same time period the logical signal from the second data slicer is low.

7. The optical receiver of claim 1 wherein the circuit is to detect a logic state transition in the logical signal of the first data slicer between first and second adjacent clock cycles and determine there is an error in the logical signal of the second data slicer if the logical signal of the second data slicer is different from the logical signal of the first data slicer in the second clock cycle.

8. The optical receiver of claim 1, wherein the circuit is to:
   detect a transition of the logical signal of the first data slicer from low in a first time period to high in a second time period;
   detect whether the logical signal of the second data slicer is low or high in the second time period; and
   determine there is an error in the logical signal of the second data slicer if the logical signal of the second data slicer is low in the second time period.

9. The optical receiver of claim 1, wherein the circuit is to determine an error rate based on counting a number of detected errors in the logical signal of the second data slicer which occur during a predetermined period of time, or during a predetermined number of bits or logic state transitions.

10. The optical receiver of claim 1, wherein in response to determining that an error rate of the logical signal of the second data slicer is above a first threshold, the circuit is to increase the power supply voltage input to the TIA.

11. The optical receiver of claim 1, wherein in response to determining that an error rate of the logical signal of the second data slicer is equal to or below a second threshold, the circuit is to cause the power supply voltage input to the TIA to be decreased.

12. The optical receiver of claim 1, wherein in response to determining that an error rate of the logical signal of the second data slicer is below a first threshold, but above a second threshold, the circuit is to maintain the power supply voltage input to the TIA at a same level.

13. The optical device of claim 1 wherein, based on a count of a number of detected errors of the logical signal of the second data slicer, the circuit is to output a digital control signal to a power supply to control the voltage level supplied by the power supply to the TIA.

14. A method comprising:
   converting, by a photodetector, an optical signal to a current signal;
   converting, by a transimpedance amplifier (TIA), the current signal to a voltage signal;
   converting, by a first data slicer, the voltage signal into a first logical signal;
   converting, by a second data slicer, the voltage signal into a second logical signal, wherein the second data slicer is less sensitive than the first data slicer;
   detecting, by a circuit, errors in the second logical signal by comparing the second logical signal to the first logical signal; and
   adjusting, by the circuit, a power supply voltage input to the TIA based on a count of the number of detected errors in the second logical signal.

15. The method of claim 14, wherein a voltage threshold at which the second data slicer converts the voltage signal to a high logical output is higher than a voltage threshold at which the first data slicer converts the voltage signal into a high logical output.

16. The method of claim 14, wherein the detecting errors includes determining there is an error when the first logical signal is high and, in a same time period, the second logical signal is low.

17. The method of claim 14, further comprising detecting, by the circuit, a logic state transition in the first logical signal between first and second adjacent clock cycles,
   wherein the detecting errors includes determining there is an error in the second logical signal when the second logical signal is different from the first logical signal in the second clock cycle.

18. The method of claim 14, further comprising:
  detecting, by the circuit, a transition of the first logical signal from low in a first time period to high in a second time period; and
  detecting, by the circuit, whether the second logical signal is low or high in the second time period,
  wherein the detecting errors includes determining there is an error in the second logical signal of the second data slicer when the second logical signal is low in the second time period.

19. The method of claim 14, further comprising determining, by the circuit, an error rate by counting a number of detected errors in the second logical signal that occur during a predetermined period of time or during a predetermined number of bits or logic state transitions.

20. The method of claim 19, wherein the adjusting the power supply voltage input includes:
  increasing the power supply voltage input to the TIA when the error rate of the second logical signal is above a first threshold,
  decreasing the power supply voltage input to the TIA when the error rate of the second logical signal is equal to or below a second threshold, and
  maintaining the power supply voltage input to the TIA at a same level when the error rate of the second logical signal is below a first threshold but above a second threshold.

* * * * *